United States Patent [19]

Sherman

[11] 4,288,724
[45] * Sep. 8, 1981

[54] IMPULSE GENERATOR FOR USE WITH PHOSPHOR ENERGIZABLE LAMPS

[76] Inventor: Eli H. Sherman, 12554 Havelock Ave., Los Angeles, Calif. 90066

[*] Notice: The portion of the term of this patent subsequent to Dec. 12, 1995, has been disclaimed.

[21] Appl. No.: 961,976

[22] Filed: Nov. 20, 1978

Related U.S. Application Data

[63] Continuation of Ser. No. 857,220, Dec. 5, 1977, Pat. No. 4,129,805.

[51] Int. Cl.³ .............................................. H05B 41/29
[52] U.S. Cl. ................................ 315/219; 315/209 R; 315/221; 315/276; 315/DIG. 7
[58] Field of Search ........... 315/205, 206, 208, 209 R, 315/219, 221, 246, 276, 278, DIG. 7

[56] References Cited

U.S. PATENT DOCUMENTS

| | | | |
|---|---|---|---|
| 3,247,422 | 4/1966 | Schultz | 315/206 |
| 3,731,142 | 5/1973 | Spira et al. | 315/209 R X |
| 4,004,185 | 1/1977 | Edmondson et al. | 315/278 X |
| 4,017,785 | 4/1977 | Perper | 315/221 X |
| 4,129,805 | 12/1978 | Sherman | 315/219 |

FOREIGN PATENT DOCUMENTS

2610944 9/1977 Fed. Rep. of Germany ...... 315/219

*Primary Examiner*—Eugene La Roche

*Attorney, Agent, or Firm*—Robert J. Schaap

[57] ABSTRACT

An impulse generator for use with phosphor energizable lamps, e.g. gaseous discharge lamps and electroluminescent lamps, and which eliminates the need of a conventional ballast and starting mechanism. The impulse generator includes a pair of terminals which are adapted to be connected to a conventional source of alternating electrical current with a diode rectifying bridge for rectifying the electrical current. A solid-state circuit switching element is connected to the rectifier and operates in conjunction with a timing means including a resistive capacitive network. Moreover, the solid-state switching element is connected to a primary coil which is coupled to a secondary coil. The secondary coil includes terminals for connection to the lamp. The circuit is operable to generate pulses in a sequence and at time intervals sufficient to maintain energization of the lamp. Thus, the pulses transmitted to the lamp will maintain ignition of the lamp, such that the pulses are applied to the lamp prior to termination of an electric discharge in the lamp. In one of the preferred aspects, the primary and secondary coils form part of a core transformer with the housing sections being separated to create a gap therebetween. In another aspect, the transformer includes an electrically non-conductive spool which holds the windings and with an electrically conductive core located within the non-conductive spool.

42 Claims, 9 Drawing Figures

IMPULSE GENERATOR FOR USE WITH PHOSPHOR ENERGIZABLE LAMPS

RELATED APPLICATION

This application is a continuation of application Ser. No. 857,220, filed Dec. 5, 1977 for "IMPULSE GENERATOR FOR USE WITH PHOSPHOR ENERGIZABLE LAMPS", now U.S. Pat. No. 4,129,805.

BACKGROUND OF THE INVENTION

1. Purpose of the invention

This invention relates to certain new and useful improvements in impulse generators and method of use therefor, and, more particularly, to impulse generators in connection with phosphor excitable lamps for energizing the lamp.

2. Brief Description of the Prior Art

For many years, phosphor excitable lamps have been used, including the well-known fluorescent lamp, and which have replaced the conventional incandescent lamp in many applications. These phosphor excitable lamps generally operate on the principle of generating ultraviolet radiation and converting the ultraviolet radiation to visible light by energizing the phosphor coating and hence exciting the phosphors generated by the phosphor coating. Phosphor excitable lamps include, for example, the gaseous discharge lamp and the electroluminescent lamp.

The gaseous discharge lamp, which includes the so-called fluorescent lamp, operates on a principle which makes use of ultraviolet energy generated by a mercury vapor in an inert gas and which activates a coating of a fluorescent material, often referred to as a phosphor, on the inner surface of the glass tube. The phosphor acts as a transformer converting the ultraviolet radiation into visible light.

In most conventional fluorescent lamps and similar gas discharge lamps, the lamp includes a hot cathode located on the interior thereof and connected to terminals on the exterior of the lamp. In the electroluminescent lamp, a capacitive effect is achieved with a phosphor coating on a transparent sheet and with a second electrode being comprised of an aluminum or similar metal sheet. These lamps are operable in conjunction with a number of conventionally known ballasts. The ballast generally is a series reactor transformer and includes a large number of windings. Thus, the ballast acts as an inductive device to increase the voltage for igniting the phosphor excitable lamp. The ballast primarily serves to both ignite the lamp and to also limit the current to the lamp. Immediately after the lamp is ignited, the impedance of the lamp drops to an almost zero level and, hence, it is necessary to limit the current after ignition in order to avoid burning-up the lamp. The inductive reactance in the conventional ballast operates to limit the current after ignition of the lamp.

There are many disadvantages of the conventional ballast system used in connection with phosphor lamps. One of the disadvantages lies in the weight and size factor of the conventional ballast. Due to the heavy transformer, provision must be made in each conventional lamp fixture in order to mount and support the weight of the ballast. Moreover, if they are used for any excessive period of time, the ballast may heat up and may tend to burn out and require replacement thereof.

In addition to the above, the transformer core in the ballast will tend to vibrate and generate a hum in the audible frequency spectrum. While this hum may not have a great amplitude, it is, nevertheless, distracting and uncomfortable to an individual in proximity to the light source. In addition to the above problems, the vibration of the core in the ballast would often tend to create a flicker in the light. While the flicker may occur at a high frequency, it is nevertheless oftentimes visible and apparent to the observer.

Another disadvantage of the conventional ballast is that large capacitors are oftentimes required to correct the power factor and phase displacement. These capacitors are relatively expensive due to their size and thus substantially increase the overall cost of the ballast. Even moreso, the use of an inductive device of this type often generates a significant amount of heat and, in many cases, where the lamp is not mounted in an environment where air flow can dissipate the heat, other means must be employed to dissipate the heat generated by the ballast. The conventional ballast also tends to generate undesirable radio frequency signals which may interfere with RF operated equipment.

One of the primary disadvantages of the conventional ballasts, at least in present energy shortage times, is that the ballast requires a very substantial amount of current in order to maintain energization of the lamp. After the lamp has been ignited, a continuing current source is applied to the two electrodes of the lamp in order to maintain energization thereof. However, it has been found to maintain energization thereof. However, it has been found in the present invention that it is possible to cause ignition and maintain energization of the lamp with reduced energy applied to the lamp when compared to conventional prior art phosphor excitable lamps.

OBJECTS OF THE INVENTION

It is, therefore, the primary object of the present invention to provide an impulse generator of the type used with phosphor excitable lamps and which is capable of pulsing a phosphor excitable lamp to maintain a relatively constant light output therefrom.

It is another object of the present invention to provide an impulse generator of the type stated which significantly lowers power requirements for maintaining light emission from a phosphor excitable lamp.

It is a further object of the present invention to provide an impulse generator of the type which generates pulses in a sequence and at time intervals sufficient to maintain energization of the lamp and which does not require large capacitors for power factor corrections and phase displacement.

It is an additional object of the present invention to provide a system of a phosphor excitable lamp and an impulse generator for use therewith and which system operates on relatively low power requirements and eliminates the need for ballast and/or a starting mechanism.

It is another salient object of the present invention to provide a method for igniting and controlling the current flow to a phosphor excitable lamp by use of an impulse generator which generates pulses in a sequence and at a proper interval to cause ignition of and maintain energization and phosphor excitation at the lamp.

With the above and other objects in view, my invention resides in the novel features of form, construction, arrangement and combination of parts presently described and pointed out in the claims.

GENERAL DESCRIPTION OF THE DISCLOSURE

The impulse generator is designed for use with phosphor excitable lamps, e.g. gaseous discharge lamps, such as, for example the known fluorescent lamps and the relatively new electroluminescent lamps. The impulse generator is designed to ignite and control current flow to such lamps. The generator of the present invention in its broad aspect includes a pulse generating means for generating pulses of a magnitude to energize the lamps and a means to control timing of the pulses as applied to the phosphor excitable lamps.

The present invention is operable with generally all forms of phosphor excitable lamps, that is lamps which operate on the principle of generating ultraviolet light and excitation with phosphors to produce light in the visible spectrum. Thus the impulse generator is operable with gaseous discharge lamps including the fluorescent lamp and electroluminescent lamps often referred to as the EL lamps. These lamps are also characterized by their frequency and voltage dependence characteristics.

The impulse generator includes the means for generating impulses which comprises at least an NPN transistor operable in conjunction with the pulse control timing means or so-called pulse control triggering means. In this case, the pulse control triggering means is a resistive network comprising a resistor and a capacitor connected in series and also connected across the base of the transistor. The pulse generating means includes a first coil or primary coil which is connected to the collector of the transistor and is often referred to as a collector coil. The primary coil operates in conjunction with a pair of secondary coils which are electromagnetically coupled to the primary coil. The terminals of the secondary coils are thereupon connected to the opposite electrodes on the phosphor excitable lamp.

The emitter of the transistor is also connected through a third coil or additional primary coil to the resistive capacitive network, and which serves as a feedback coil. Moreover, the pulse generating means may be connected directly by a conductor to one of the terminals on the lamp.

The primary and secondary coils preferably form part of a core transformer. In this case, the core transformer comprises a central core with the primary and secondary coils being wound upon the central core. A pair of housing sections is disposed over the core and the coils to substantially enclose the core and the coils. The housing sections are spaced apart from each other by a gap. The size of the gap is determined in order to maintain the life of the transistor.

In another embodiment of the invention, the transformer, which operates as a type of auto-transformer, is constructed so that the outer housing is eliminated. In this case, the coils are wound on an electrically nonconductive tubular spool with a conductive core disposed within the spool.

One of the aspects of the present invention is that the pulse control timing means is designed to cause generation of pulses in a sequence and at a proper interval to cause and maintain energization of the lamp, so that there is no termination of an electric discharge in the gaseous discharge lamp. In this way, the lamp is consistently energized by pulses designed to ignite the lamp and then permit the lamp to maintain the phosphor excitation. Thus, the pulses provided on a basic and are timed so that the lamp will always maintain a light output. Moreover, less current is required and this results in a substantial energy savings.

BRIEF DESCRIPTION OF THE DRAWINGS

Figure 1:
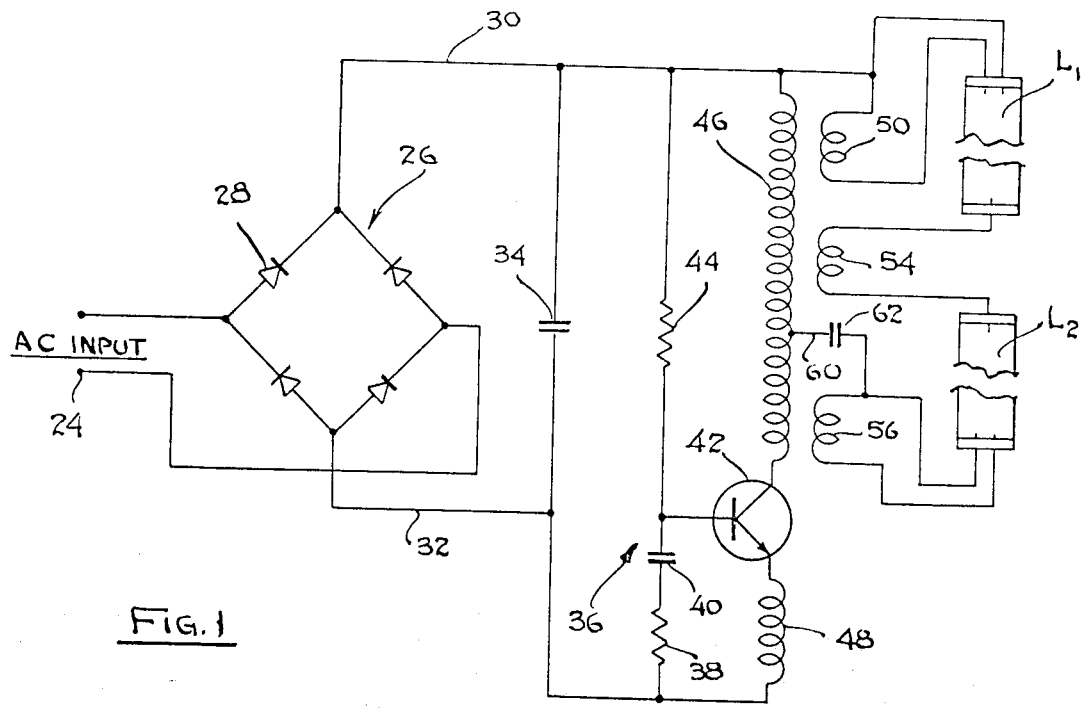
Figure 2:
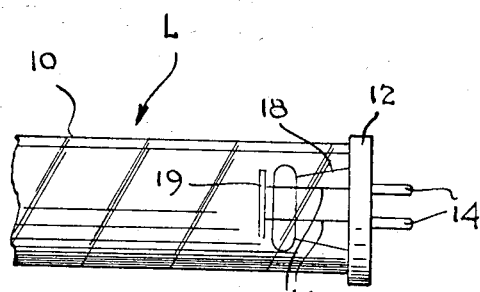
Figure 3:
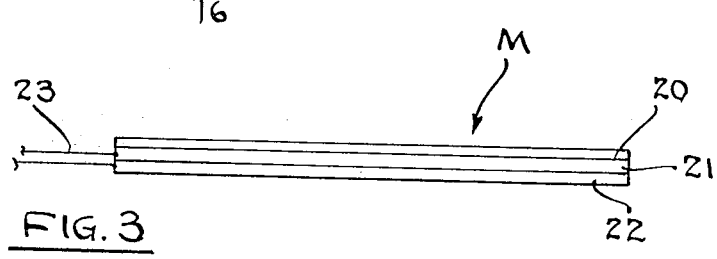
Figure 4A:
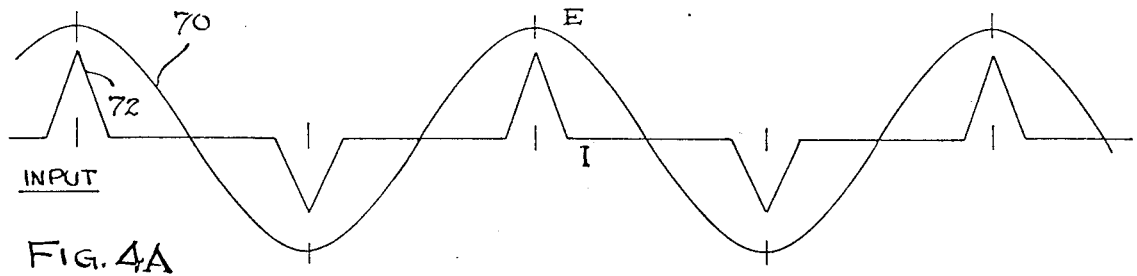
Figure 4B:
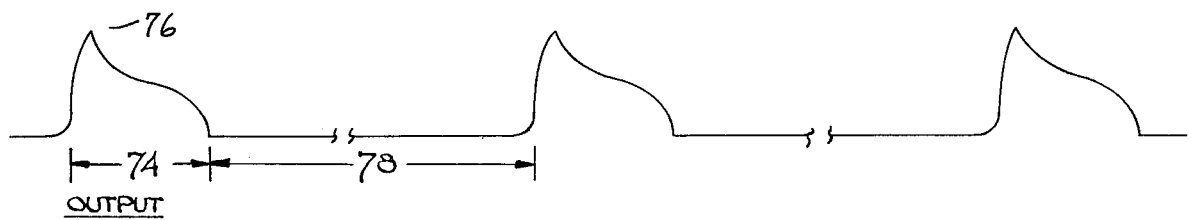
Figure 5:
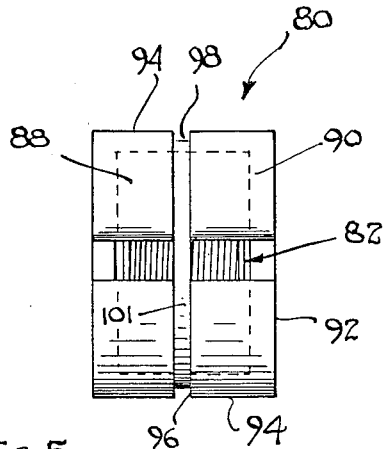
Figure 6:
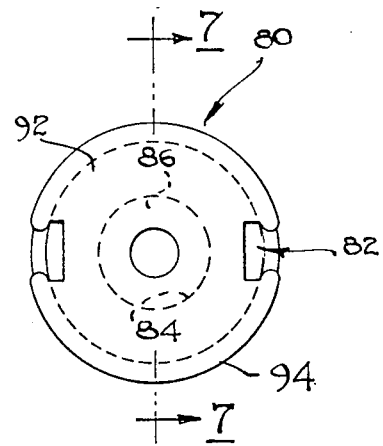
Figure 7:
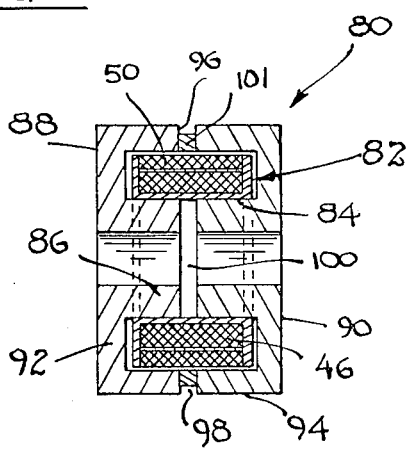

Having thus described by invention in general terms, reference will now be made to the accompanying drawings in which:

FIG. 1 is a schematic view of a circuit which forms part of the impulse generator of the present invention and showing a pair of gaseous discharge lamps connected thereto;

FIG. 2 is a fragmentary side elevational view, partially broken away and in section, and showing a portion of a conventional gaseous discharge lamp;

FIG. 3 is a schematic side elevational view showing a conventional electroluminescent lamp;

FIG. 4A is a schematic view of AC power input into the impulse generator of FIG. 1 and showing current and voltage relationship;

FIG. 4B is a schematic view of output pulses which are generated by the impulse generator of FIG. 1;

FIG. 5 is a side elevational view of a core transformer forming part of the impulse generator of the present invention;

FIG. 6 is an end elevational view taken along line 6—6 of FIG. 5;

FIG. 7 is a vertical sectional view taken along line 7—7 of FIG. 6; and

Figure 8:
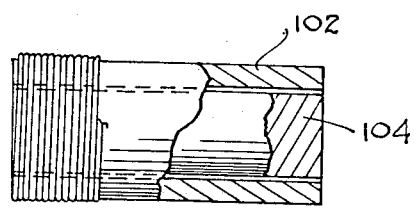

FIG. 8 is a side elevational view partially in section showing a modified form of core transformer which may be used with the impulse generator of the present invention.

DETAILED DESCRIPTION OF A PREFERRED EMBODIMENT

Referring now in more detail and by reference characters to the drawings which illustrate a preferred embodiment of the present invention, A designates an electrical circuit forming part of the impulse generator of the present invention. In this case, the impulse generator A is shown as being connected to a pair of gaseous discharge lamps designated as $L_1$ and $L_2$.

The gaseous discharge lamps are of a conventional construction, and one of such lamps $L_1$ is more fully illustrated in FIG. 2 of the drawings. The lamp comprises a bulb 10, which is shown as having a straight glass tube, although the tube could adopt other shapes, as for example, a circular shape or the like. One end of the tube 10 is provided with a non-conductive base 12 having a plurality (two as shown) of electrical terminals 14. These terminals which are often referred to as "base pins" are connected to lead-in wires 16 located internally within the tube and the lead-in wires are located in a so-called "stem press" 18 constructed of a material to assure the same coefficient expansion as the glass tube 10. The lead-in wires 16 are connected to a hot cathode 19 which is designed to ignite a gas in the tube as hereinafter described. The hot cathode is coated with an emissive material which emits electrons and is usually made of a coil, e.g. a simple coil tungsten wire. It should be understood that a pair of similar hot cathodes and related structure would be included at each end of the glass tube 10.

The inside of the bulb or tube 10 is provided with a phosphor coating which transforms ultraviolet radiation into the visible light. The color of the light often depends on the composition of the phosphor. A minute amount of mercury is also located in the bulb to furnish the mercury vapor for purposes of ignition. In addition, an inert gas, such as argon, krypton and the like, may be used.

The coating on the hot cathode is generally formed of an emissive material such as barium, strontium, calcium oxide and the like, and which emits electrons when heated to an operating temperature of about 950° C. After the cathode has been heated to the proper temperature, thermionic emission will occur. The emitted electrons, upon collision, will release ultraviolet radiation which is converted into visible light by the phosphors.

FIG. 3 illustrates in schematic side elevational view, a form of electroluminescent lamp M which can be used in combination with the impulse generator of the present invention. The lamp M is comprised of a plastic plate 20 which is translucent and preferably transparent in its construction. Applied to one surface of the plate 20 is a phosphor coating 21 and disposed against the phosphor coating 21 is a metal sheet such as an aluminum sheet 22. Conductors 23 are attached to the coating 21 and the metal sheet 22. These conductors are adapted for connection to a suitable source of current through a ballast, and in the case of the present invention would be connected to inputs of the impulse generator.

The electroluminescent lamp M operates on essentially the same principle as the gaseous discharge lamp. In this case the phosphors are not located in a tube or bulb. However, the electroluminescent lamp operates with a very high frequency creating a capacitive effect across the phosphor coating 21 and the metal sheet 22, with the phosphors converting the ultraviolet radiation into visible light radiation. Inasmuch as both lamps operate on similar principles, insofar as the impulse generator of the present invention is concerned, the operation of the impulse generator will only be described in connection with a gaseous discharge lamp.

As previously indicated, a ballast with a starting mechanism included therein, or otherwise a separate starting mechanism in combination with the ballast, is often required for maintaining the light output of the fluorescent tube or similar gaseous discharge lamp. In this case, the present invention replaces the conventional ballast and/or starting mechanism with the impulse generator A. The impulse generator A generally includes a pair of input terminals 24 which are capable of being connected to a suitable source of electrical current, as for example, 110-volt alternating electrical current. The terminals 24 are connected to opposite sides of a diode rectifier bridge 26 including four diodes 28 in the arrangement as illustrated in FIG. 1 of the drawings. The bridge rectifier allows the impulse generator to be used with essentially any frequency signal since the input signal will be rectified into a DC signal and this DC signal can be transmitted to the collector of a transistor, as hereinafter described.

Connected across the two conductors 30 and 32 from the diode bridge 26 is a capacitor 34 which operates as a ripple filter and is designed to filter ripples from the signal in order to provide an essentially DC pure signal.

The diode rectifier bridge 26, along with the other components of the impulse generator, allow the impulse generator to be used with either alternating electrical current or direct current. Moreover, the impulse generator can be operated with essentially any voltage and frequency levels. Thus, for example, the source of current may be from the electrical system of a mobile apparatus, such as an automobile, airplane or the like.

The conductor 32 is also connected to a resistive capacitive network 36 comprised of a resistor 38 and a capacitor 40, the latter of which is connected to the base of an NPN transistor 42, in the manner as illustrated in FIG. 1 of the drawings. In like manner, the base of the transistor 42 is similarly connected to the conductor 30 through another resistor 44. The resistor 38 and the capacitor 40 also operate in combination as a current limiting device, namely to keep the current level within a range capable of being handled by the transistor 42. Thus, the resistor 38 should have a sufficiently high resistivity in order to eliminate transients from being applied to the base of the transistor 42. The capacitor 40 also prevents alternating current from passing into the DC portion of the circuit and similarly furnishes a drive to the base of the transistor 42. It can be observed that as the voltage changes, the base drive to the transistor would also change. The resistor 44 controls the voltage drop across the transistor 42 and permits bias on the base to start the transistor 42.

A primary coil 46 is connected across the conductor 30 and the collector of the transistor 42 and, in this case, is often referred to as a "collector transformer coil". In like manner, an additional primary coil, often referred to as an "emitter coil", or "emitter feedback coil", 48 is connected to the emitter of the transistor 42 and to the resistive capacitive network 36, in the manner as illustrated in FIG. 1 of the drawings. In essence, the emitter coil is really a continuation of the collector coil and the two coils 46 and 48 could have been shown as one continuous coil with taps on the coil connected to the collector and emitter of the transistor 42.

The primary coil 46 operates in conjunction with three secondary coils 50, 54 and 56 which have terminals connected to the opposite terminals on the lamps $L_1$ and $L_2$. In this respect, it can be observed that any number of secondary coils may be employed, depending on the number of lamps which are to be energized by the circuit. Thus, if only one lamp were required, two secondary coils would be employed in order to furnish pulses to the opposite terminals of the lamp. The number of lamps and the size of the lamps is, of course, limited by the circuit, and the circuit can be designed with larger component values in order to accommodate larger sizes or a larger number of lamps.

One of the terminals of the lamp, as for example the lamp $L_1$, is connected through a conductor 58 to the terminal of the primary coil 46 in common with the conductor 30. In the case of two lamps, one of the terminals of the lamp $L_2$ is connected through a conductor 60 to a tap on the primary coil 46. In this case, a capacitor 62 would be located in the conductor 60. While DC current may exist in the conductor 58, it cannot pass through the lamp by virtue of the capacitor 62. Moreover, by virtue of this construction, the lower terminal of the lower bulb will have a ground potential. Thus, a potential gradient exists between the two bulbs as shown.

The timing of the circuit is such that pulses are applied to the terminals of the lamp at a proper interval to maintain energization and relatively constant light output. Thus, the pulses are generated in a sequence and in a proper time interval so that they cause ignition and maintain energization of the lamp so that there is no termination of an electrical discharge in the lamp. Thus, in other words, pulses are applied to the terminals of the lamp to turn the lamp on and maintain energization of the lamp with a source of power across the terminals of the lamp, so that considerable power savings is achieved. The timing of the pulses is determined by the inductive capacitance and resistance and the voltage of the output pulses. By varying the capacitance in the timing circuit, it is possible to increase the efficiency of the device. In this respect, a variable capacitor could be substituted. The frequency of strobing the lamp with these output pulses is significantly high so that it is not visible to the normal eye. Moreover, in view of the fact that there is no iron core, as in the classical ballast, there is no generation of hum from the impulse generator.

The frequency of strobing the lamp is sufficiently high so that it is beyond the audible range and also does not create any radio frequency interference. The maximum frequency should be about 50 kilohertz and the minimum frequency should be about 2 kilohertz, although as indicated above the frequency is voltage dependent.

The emitter coil 48 provides a feedback through the resistive capacitive network 36 to the collector coil 46. It should also be observed that the secondary coils 50, 54 and 56 are relatively small with respect to the cathode coil 46, and usually include only a few turns. Moreover, it can be observed that with the circuit of the present invention it is possible to both ignite the lamps $L_1$ and $L_2$ and to provide an energy source at high frequency from the same transformer coils. Thus, the cathodes are energized to ignite the lamp from the same source that drives the lamp.

In the case of one lamp, it is desirable to also use a capacitor, such as the capacitor 62, in the conductor 60 in order to limit the current applied to one of the terminals of the lamp $L_2$. A positive potential is applied to the collector of the transistor since the collector coil is of low resistance. The resistor 44 has a relatively high resistivity and provides a bias on the base, thereby causing the emitter to become negative with respect to the collector. In this way, current will flow through the emitter coil and since the emitter coil is coupled to the collector coil, pulses are generated at a time frequency established by the resistive capacitive network 36. The pulse amplitude will increase as the frequency increases and the frequency increases as the voltage increases, as indicated above.

It can be observed in accordance with the above construction that the impulse generator of the present invention operates somewhat as an oscillating circuit, although it does not oscillate on an AM or FM mode. Actually, the circuit oscillates on a pulse mode. The pulses are timed such that the lamp phosphors receive energy at certain intervals so that excitation of the gas in the lamp does not die out.

The device of the present invention also differs significantly from the conventional reactor transformer in the conventional ballast in that current is limited by the action of the voltage dependent frequency characteristics. This provides regulation to inhibit the in-rush of current as the lamps ignite which causes the high impedance level to drop almost toward a zero level. Thus, the device of the present invention provides almost the same output of light intensity as the conventional unit, but with significantly less energy. Moreover, the lamp is ignited in a manner to increase the overall life of the lamp. This results from the fact that the thrust of the pulses to the cathode is much less than by the conventional ballast. The power factor of the impulse generator is almost unity which is an advantage in many applications, particularly for utilities and the like.

FIGS. 4A and 4B illustrate the input and output wave forms. Particularly, FIG. 4A illustrates a sinusoidal voltage wave form designated as 70 with current pulses in the input wave form occurring at the peaks in the amplitude in the voltage wave form. The output pulses are more fully illustrated in FIG. 4B, and it can be observed that for the direction and polarity of the output pulse as shown, the output pulse generally has a rather gradual fall time from the leading edge to the trailing edge for the greater portion of the pulse width. Thus, the pulse width is designated by reference numeral 74 and it can be observed that about ⅔ of the pulse width includes the gradual fall at the leading edge and with a rather sharp rise time to generate a peak 76 on each of the pulses. Thereafter, it can be observed that the fall time in each of the pulses is quite rapid at the trailing edge. Moreover, by reference to FIG. 4B, it can be observed that there is a time lag between the next positive polarity pulse, (not shown) and designated by reference numeral 78. This time lag may be occupied by a negative polarity pulse as measured from the trailing edge of one positive polarity pulse to the leading edge of the next positive polarity pulse.

The circuit creates the slight "bend" in the trailing portion of the pulse and also only provides a very small peak so that it leads into the rapid fall time. The voltage is somewhat gradual and hyperbolic for 90% of the time period in the waveform and wave direction as shown in FIG. 4B. In this way, lamp life is increased significantly.

If the portion of the waveform between positive polarity pulses, e.g., the portions designated by reference numeral 78 were occupied by a negative polarity pulses of a size and shape similar to the polarity pulses, then at least one the polarity positive pulses, the lamps would be energized by pulses having an initially sharp rise time followed by a gradual fall time and which fall time occupies the greater portion of the pulse width. Further the tail end of each of the pulses have a fairly sharp decay, as in the waveform in FIG. 4B. This is an important factor in the present invention in that where the voltage and current waveform have pulses with a relatively sharp rise time and a relatively gradual fall time in the manner as shown, the power applied to the lamp is such that the lamp is energized in a frequency of pulses and at power levels designed to maintain energization of the lamp with minimum energy requirements. The current and voltage waveforms are designed so that energy is applied to the lamp to maintain energization of the same with the pulses as shown in FIG. 4B such that the lamps are ignited with a relatively high power source and followed by a gradual decay which is sufficient to maintain energization of the lamps. While the exact theory of power savings is not understood as described herein, it is believed that there is a relation between the current pulses and voltage pulses, with the waveforms shown in FIG. 4B, which enable the power savings to be achieved with the same light output as compared to conventional phosphor energizable lamps powered with conventional ballasts.

The transformer coils 46 and 48, along with the secondary coils 50, 54 and 56, are preferably wound in a core transformer 80 of the type illustrated in FIG. 5 of the drawings. Core transformers, and particularly ferrite core transformers, are highly desirable for high frequency operation. In this case, the core transformer 80 generally comprises a cylindrically shaped central spool 82 upon which the coils are wound. The spool 82 is formed of an electrically non-conductive material such as a plastic material. The spool 82 has a hollow center 84 and accommodates inwardly intending tabs 86 on each of a pair of opposed housing sections 88 and 90. By reference to FIG. 6, it can be observed that the housing sections 88 and 90 are generally cylindrical in shape and have an outer end wall 92 along with a peripherally extending annular side wall 94. When in the assembled relationship, it can be observed that the inner edges 96 of each of the side walls 94 are spaced from each other to form a gap 98 and, in like manner, the inwardly extending projections 86 are spaced apart from each other in order to form a gap 100. The gap 100 has the same size as the gap 98. A spacer 101 of electrically non-conductive material, e.g. a cardboard material, may also be located in the gap 100.

In the preferred aspect of the present invention, the distance between the two housing sections which forms the gap should be about 3/16". If the gap is too small, then energy savings are decreased, and if the gap is too large, then it will have a tendency to burn-out the transistor.

The housing sections are designed so that they generally enclose the magnetic lines of force in the housing configuration. One of the unique aspects of the present invention is that the typical core transformer is not designed to be used with a gap between the housing sections. However, Applicant has found that it materially enhances the overall efficiency and effectiveness of the pulse generator by employing a gap between the two housing sections.

FIG. 8 illustrates another form of transformer which may be used with the present invention and includes a spool 102 similar to the previously described spool 82. Again, the various coils are wound on the spool 102 in the same manner as previously described. However, in this embodiment of the transformer, the housing sections 88 and 90 are eliminated and a central core 104 formed of an electrically conductive material, such as an iron core, is inserted in the spool. This form of transformer has also been found to be effective in retaining the magnetic lines of force.

The transformer acts as a type of auto-transformer in that all of the coils are wound on the same spool. Thus, the secondary coils may be wound over the primary coil. Relative to a 120-volt input, the collector coil may have about 300 volts potential thereacross and the emitter coil may have about a 100-volt potential thereacross. Due to the size of the secondary coils, they will each have about a 3 to 4-volt potential thereacross.

The device of the present invention has been tested and found to provide considerable power savings. Thus, in most cases at least a 34% percent reduction in power is obtained to maintain the same light output. Moreover, the impulse generator is relatively cool after many hours of use whereas a conventional ballast is too hot to be held in the human hand.

Thus, there has been illustrated and described a unique and novel impulse generator for use with phosphor energizable lamps and which fulfills all of the objects and advantages sought therefor. It should be understood that many changes, modifications, variations and other uses and applications will become apparent to those skilled in the art after considering this disclosure and the accompanying drawings. Therefore, any and all such changes, modifications, variations, and other uses and applications which do not depart from the spirit and scope of the invention are deemed to be covered by the invention which is limited only by the following claims.

Having thus described my invention, what I desire to claim and secure by Letters Patent is:

1. A generator for use with a phosphor excitable lamp, said generator comprising:
   (a) input means to receive electrical current,
   (b) means operatively connected to said input means for conducting said electrical current,
   (c) a pulse generating means comprising:
      (1) a solid state switching element connected to receive the electrical current,
      (2) a primary inductive coil means connected to at least one terminal of said switching element,
   (d) secondary coil means located to be coupled with said primary coil means, and developing a voltage therein substantially less than in the primary coil means,
   (e) terminal means on said secondary coil means for connection to a phosphor excitable lamp,
   (f) a first electrical current carrying conductor connected to one end of said primary coil means and being adapted for electrical connection to one terminal of said phosphor excitable lamp, and
   (g) an intermediate tap on said primary coil means,
   (h) a second electrical current carrying conductor connected to said intermediate tap on said primary coil means and being adapted for electrical connection to another terminal of said phosphor excitable lamp,
   (i) a capacitive means in said second electrical current carrying conductor,
   (j) said pulse generating means generating pulses in a sequence and at intervals sufficient to maintain energization of said lamp, said pulses being generated with relatively high peak rise on the leading edge of said pulses and a relatively gradual decay from said high peak for a greater portion of the pulse width of each of said pulses but which decay reaches a relatively sharp fall to a zero level at the trailing edge of said pulses, such that the pulses are designed to maintain ignition and energization of the lamp with comparative current and voltage waveforms to achieve a power savings, and which pulses are transmitted from said primary coil means to said lamp through coupling of said lamp to said primary coil means.

2. The generator of claim 1 further characterized in that said solid-state switching element is a transistor and said generator comprises pulse control timing means having a resistive-capacitive network.

3. The generator of claim 2 further characterized in that said primary coil means is connected to the collector of said transistor, said resistive-capacitive network is connected to the base of said transistor and an additional coil means is connected to the emitter of said transistor.

4. The generator of claim 1 further characterized in that the pulses which are generated with the relatively high peak rise on the leading edge of the pulses and a relatively gradual decay from said high peak for a greater portion of the pulse width but which decay reaches a relatively sharp fall to a zero level at the trailing edge of the pulses are current pulses.

5. The generator of claim 2 further characterized in that said primary and secondary coil means form part of a core transformer.

6. The generator of claim 5 further characterized in that said core transformer comprises a central sleeve with said primary and secondary coil means wound on said central sleeve, a pair of electrically conductive housing sections disposed over said sleeve and coil means to substantially enclose said coil means and sleeve, said housing sections being spaced apart from each other by a gap.

7. The generator of claim 5 further characterized in that said core transformer comprises an electrically nonconductive sleeve with said coil means wound upon said sleeve, and an electrically conductive metallic core disposed within said sleeve.

8. The generator of claim 2 further characterized in that said phosphor excitable lamp comprises a gaseous discharge lamp or an electroluminescent lamp.

9. A generator for igniting a phosphor excitable lamp and controlling electrical power applied to said phosphor excitable lamp, said generator comprising:
  (a) means for receiving an electrical current,
  (b) pulse generating means connected to said last-named means for generating pulses of a magnitude to ignite and maintain energization of a phosphor excitable lamp, said pulse generating means comrising a first inductive member with a pair of end terminals and an intermediate tap thereon, and a solid-state circuit switching element connected to said inductive member,
  (c) pulse control means operatively connected to said pulse generating means for enabling the pulses to be applied in a sequence and at a proper interval to said lamp to cause ignition of the lamp and maintain energization of the lamp so that there is no termination of an electric discharge in said lamp, said pulse generating means being designed to enable said pulses to be generated with a relatively high peak rise on the leading edges of said pulses and a relatively gradual decay from said high peak for a greater portion of the pulse width of each of said pulses but which decay reaches a relatively sharp fall to a zero level at the trailing edges of said pulses, such that the pulses are designed to maintain energization of the lamp with comparative current and voltage waveforms to achieve a power savings, and
  (d) conductive means for connecting said pulse generating means to a phosphor excitable lamp, said conductive means comprising:
    (1) a pair of current carrying conductors with one connected to one end terminal and the other connected to the intermediate tap on said first inductive member and adapted for connection to said phosphor excitable lamp, and
    (2) a secondary inductive member electromagnetically coupled to said first inductive member and adapted for connection to said phosphor excitable lamp, and
    (3) a capacitive means in said other of said current carrying conductors.

10. The generator of claim 9 further characterized in that said pulse generating means generates pulses having an amplitude of short rise time and long fall time.

11. The generator of claim 10 further characterized in that the generated pulses are generated at a time corresponding to current pulses in the electrical current received by the generating means.

12. The generator of claim 9 further characterized in that the pulses which are generated with the relatively high peak rise on the leading edge of the pulses and a relatively gradual decay from said high peak for a greater portion of the pulse width but which decay reaches a relatively sharp fall to a zero level at the trailing edge of the pulses are current pulses.

13. The generator of claim 9 further characterized in that:
  (a) said first inductive member is a primary coil connected to one terminal of said switching element, and
  (b) said solid-state switching element connected to said primary coil.
  (c) said means for connecting comprises terminal means on said primary coil.

14. The generator of claim 13 further characterized in that said solid-state switching element is a transistor and said pulse control means comprises a resistive-capacitive network.

15. The generator of claim 14 further characterized in that said first inductive member is a primary coil, and said primary coil is connected to the collector of said transistor, said resistive-capacitive network is connected to the base of said trasistor and an additional coil is connected to the emitter of said transistor.

16. The generator of claim 14 further characterized in that one of said pair of conductors connects said primary coil to a conductive terminal on said lamp, and the other of the conductors connects the primary coil to an opposite conductive terminal on said lamp.

17. The generator of claim 14 further characterized in that said primary and secondary coils form part of a core transformer.

18. A gaseous discharge lamp system comprising:
  (a) a gaseous discharge lamp comprised of
    (1) an enclosed bulb,
    (2) an electrically energizable element associated wit said bulb,
    (3) at least a pair of terminals associated with said bulb, at least one of said terminals being connected to said electrically energizable element, and
    (4) an excitable phosphor in said lamp,
  (b) a generator operatively connected to said lamp and being comprised of:
    (1) pulse generating means for generating pulses of a magnitude sufficient to ignite said gaseous discharge lamp, said pulse generating means comprised of at least an inductive coil having a pair of end terminals,
    (2) a first electrical current carrying conductor connected to one end terminal on said inductive coil and being adapted for electrical connection to one terminal of said gaseous discharge lamp,
    (3) an intermediate tap on said inductive coil,
    (4) a second electrical current carrying conductor connected to said intermediate tap on said inductive coil and being adapted for electrical connection to another terminal of said gaseous discharge lamp,
    (5) a capacitive means in said second electrical current carrying conductor, and
    (6) pulse control means connected to the means for generating pulses for controlling the generation of pulses in a sequence and at a proper interval to maintain ignition and energization of said lamp so that there is no termination of an electric discharge in said lamp, said pulse control means operating with said pulse generating means to enable said pulses to be generated with a relatively high peak rise on the leading edges of said pulses and a relatively gradual decay from said high peak for a greater portion of the pulse width of each of said pulses but which decay reaches a relatively sharp fall to a zero level at the trailing edges of such pulses, such that the pulses are generated and applied to said lamp to maintain energization of the lamp with comparative current and voltage waveforms to achieve a power savngs.

19. The system of claim 18 further characterized in that the pulses which are generated with the relatively high peak rise on the leading edge of the pulses and a relatively gradual decay from said high peak for a greater portion to the pulse width but which decay reaches a relatively sharp fall to a zero level at the trailing edge of the pulses are current pulses.

20. The system of claim 18 further characterized in that said means for generating pulses includes a solid-state circuit switching element connected to one terminal of said inductive coil.

21. The system of claim 18 further characterized in that said pulse control means generates pulses in a sequence and at a proper interval to cause ignition of the lamp prior to the termination of an electric discharge in said lamp.

22. The system of claim 18 further characterized in that said pulse generating means generates pulses having an amplitude of short rise time and a relatively long fall time.

23. The system of claim 22 further characterized in that the pulse generating means generates pulses at a time corresponding to current pulses in the electrical current.

24. A generator for use with a phosphor excitable lamp, said generator comprising:
(a) input means to receive electrical current,
(b) means operatively connected to said input means for conducting said electrical current,
(c) a solid-state switching element connected to receive the electrical current,
(d) primary coil means connected to at least one terminal of said switching element such that said primary coil means and switching element form a means for generating electrical pulses to be applied to said lamp for maintaining energization of same,
(e) first and second terminals on said primary coil means and an intermediate tap on said primary coil means for connection to a gaseous discharge lamp,
(f) pulse control means operatively connected to said switching element for enabling the generation of pulses of relatively fast increases in amplitude with a relatively fast time peak amplitude rise at their leading edges and which peak amplitude falls rapidly after energization of said lamp and gradually for a substantial portion of the pulse width, said pulses occurring in a sequence and at intervals sufficient to maintain energization of said lamp,
(g) a first electrical current carrying conductor connected to a first terminal on said primary coil means and being adapted for electrical connection to one terminal of said phosphor excitable lamp,
(h) a second electrical current carrying conductor connected to said intermediate tap on said primary coil means and being adapted for electrical connection to another terminal of said phosphor excitable lamp, and which pulses are transmitted from said primary coil means to said lamp through coupling with said first and second current carrying conductors such that the pulses maintain energization of the lamp with comparative voltage and current waveforms to achieve a power savings, and
(i) a capacitive means in said second electrical current carrying conductor.

25. The generator of claim 24 further characterized in that said solid-state switching element is a transistor and said pulse control timing means is a resistive-capacitive network.

26. The generator of claim 25 further characterized in that said primary coil means is connected to the collector of said transistor, said resistive-capacitive network is connected to the base of said transistor and an additional coil means is connected to the emitter of said transistor.

27. The generator of claim 25 further characterized in that a secondary coil means is located to be electromagnetically coupled to said primary coil means with a voltage being developed in said secondary coil means which is substantially less than said primary coil means, said primary and secondary coil means form part of a core transformer.

28. A method of igniting and controlling current flow to a phosphor excitable lamp, said method comprising:
(a) receiving an electrical current,
(b) generating pulses in an inductive member having a pair of end terminals and an intermediate tap in response to said electrical current and which pulses are of a magnitude sufficient to at least ignite and maintain energization of a phosphor excitable lamp,
(c) controlling the generation of said pulses so that the pulses are generated with a relatively high peak rise on the leading edges of said pulses and a relatively gradual decay from said high peak for a greater portion of the pulse width of each of said pulses but which decay reaches a relatively sharp fall to a zero level at the trailing edges such that the pulses are designed to maintain energization of the lamp with comparative current and voltage waveforms to achieve a power savings,
(d) delivering the pulses from the inductive member through one current carrying conductor connected to one end terminal of said inductive member and to at least one terminal of said lamp and through a second current carrying conductor having a capacitor therein and connected to the intermediate tap on said inductive member and another terminal of said lamp to cause ignition of and maintain energization of said lamp.

29. The method of claim 28 further characterized in that the received electrical current is an alternating current, and said method comprises rectifying said current.

30. The method of claim 28 further characterized in that the method comprises generating the pulses with an amplitude of short rise time and long fall time.

31. The method of claim 28 further characterized in that the pulses which are generated with the relatively high peak rise on the leading edge of the pulses and a relatively gradual decay from said high peak for a greater portion of the pulse width but which decay reaches a relatively sharp fall to a zero level at the trailing edge of the pulses are current pulses.

32. A generator for use with a gaseous discharge lamp, said generator comprising:
(a) input terminals to receive electrical current, (b) rectifying circuit means operatively connected to said input terminals to receive said electrical current for rectifying said electrical current, (c) a transistor connected to receive the rectified current, (d) a primary coil connected to at least one terminal of said transister, (e) a secondary coil located to be electromagnetically coupled with said primary coil, and developing a voltage substantially less than that in the primary coil, (f) a feedback loop containing a feedback coil connected across a second terminal and a third terminal of said transister, (g) a resistive-capacitive circuit portion in said feedback loop such that a current is generated in and a voltage is generated across said primary coil which is sufficient to maintain energization of a gaseous discharge lamp with substantially reduced power requirements, at least said current having a relatively fast high peak rise on its leading edges and with a more gradual decay which reaches a zero level at the trailing edges, (h) terminal means on said secondary coil for connection to a gaseous discharge lamp, (i) first and second terminals and an intermediate tap on said primary coil for connection to a gaseous discharge lamp, (j) a first electrical current carrying conductor connected to the first terminal on said primary coil and being adapted for electrical connection to one terminal of said gaseous discharge lamp, (k) a second electrical current carrying conductor connected to the intermediate tap on said primary coil means and being adapted for electrical connection to another terminal of said gaseous discharge lamp, and (l) a capacitive means in the second electrical current carrying conductor.

33. The generator of claim 32 further characterized in that said primary coil is connected to the collector of said transistor, said resistive-capacitive network is connected to the base of said transistor and said feedback coil is connected to the emitter of said transistor.

34. The impulse generator of claim 32 further characterized in that an electrical conductor also connects the terminal means on said primary coil to a conductive terminal on said lamp.

35. The generator of claim 32 further characterized in that said primary and secondary coils form part of a core transformer.

36. The generator of claim 32 further characterized in that a resistor is connected between said rectifying circuit means and said third terminal of said transistor to at least control voltage drop across said transistor.

37. The generator of claim 32 further characterized in that certain of said foregoing components comprise pulse control timing means for generating pulses in a sequence and at intervals sufficient to maintain energization of said lamp.

38. The generator of claim 32 further characterized in that the pulses which are generated with the relatively high peak rise on the leading edge of the pulses and a relatively gradual decay from said high peak for a greater portion of the pulse width but which decay reaches a relatively sharp fall to a zero level at the trailing edge of the pulses are current pulses.

39. A generator for use with a phosphor excitable lamp, said generator comprising:
(a) means to receive electrical current,
(b) means operatively connected to said means to receive current for conducting said electrical current,
(c) transistor connected to receive the electrical current,
(d) a core transformer comprised of:
(1) a central sleeve,
(2) a primary coil means wound on said central sleeve,
(3) a secondary coil means wound on said central sleeve, and
(4) a pair of electrically conductive housing sections disposed over said sleeve and coil means to substantially enclose said coil means and sleeve, said housing sections being spaced apart from each other by a gap, said primary coil means being connected to at least one terminal of said transistor such that said primary coil means and transistor form a means for generating electrical pulses to be applied to said lamp for maintaining energization of same, said secondary coil means located to be electromagnetically coupled with said primary coil means,
(e) terminal means on said primary coil means for connection to a gaseous discharge lamp, and
(f) pulse control timing means comprised of a resistive capacitive network operatively connected to said transistor for causing the generation of pulses of relatively fast increases in amplitude with a relatively fast time peak amplitude rise at their leading edges and which peak amplitude falls rapidly after energization of said lamp and then gradually for a substantial portion of the pulse width, said pulses occurring in a sequence and at intervals sufficient to maintain energization of said lamp, and which pulses are transmitted to said primary coil means and said lamp through coupling with said primary coil means such that the pulses maintain energization of the lamp with cooperative voltage and current waveforms to achieve a power savings.

40. The generator of claim 39 further characterized in that said primary coil means is connected to the collector of said transistor, said resistive-capacitive network is connected to the base of said transistor and an additional coil means is connected to the emitter of said transistor.

41. The impulse generator of claim 40 further characterized in that an electrical conductor also connects said primary coil means to a conductive terminal on said lamp.

42. A generator for use with a phosphor excitable lamp said generator comprising:
(a) input means to receive electrical current,
(b) means operatively connected to said input means for conducting said electrical current,
(c) a pulse generating means comprising at least a transistor connected to receive the electrical current,
(d) a core transformer comprised of:
(1) a primary coil means, said primary coil means being connected to one terminal of said transistor,
(2) a secondary coil means located to be coupled with said primary coil means, (3) a central sleeve having said primary coil means and secondary coil means wound thereon, and
(4) a pair of electrically conductive housing sections disposed over said sleeve and said first and second coil means to substantially enclose said first and second coil means and said sleeve, said housing sections being spaced apart from each other by a gap, (e) terminal means on said secondary coil means for connection to a gaseous discharge lamp, and (f) a pulse control timing means having a resistive-capacitive network for controlling timing of the pulses, said pulse generating means generating pulses in a sequence and at intervals sufficient to maintain energization of said lamp, said pulses being generated with relatively high peak rise on the leading edge of said pulses and a relatively gradual decay from said high peak for a greater portion of the pulse width of each of said pulses but which decay reaches a relatively sharp fall to a zero level at the trailing edge of said pulses, such that the pulses are designed to maintain ignition and energization of the lamp with comparative current and voltage waveforms to achieve a power savings, and which pulses are transmitted from said primary coil means to said lamp through coupling of said lamp to said primary coil means.

* * * * *